(12) United States Patent
Tosini

(10) Patent No.: US 10,611,394 B2
(45) Date of Patent: Apr. 7, 2020

(54) APPARATUS FOR VARYING THE DIRECTION OF TRAVEL OF A VEHICLE, IN PARTICULAR A WATER-BORNE VEHICLE

(71) Applicant: I.F.R.A. S.R.L., Occhiobello (Rovigo) (IT)

(72) Inventor: Paolo Tosini, Ferrara (IT)

(73) Assignee: I.F.R.A. S.R.L., Occhiobello (RO) (IT)

(*) Notice: Subject to any disclaimer, the term of this patent is extended or adjusted under 35 U.S.C. 154(b) by 0 days.

(21) Appl. No.: 16/309,120

(22) PCT Filed: Jun. 12, 2017

(86) PCT No.: PCT/IB2017/053461
§ 371 (c)(1),
(2) Date: Dec. 12, 2018

(87) PCT Pub. No.: WO2017/216702
PCT Pub. Date: Dec. 21, 2017

(65) Prior Publication Data
US 2019/0161106 A1    May 30, 2019

(30) Foreign Application Priority Data

Jun. 14, 2016   (IT) .................... 102016000060814

(51) Int. Cl.
*G05G 11/00* (2006.01)
*G05G 13/00* (2006.01)
(Continued)

(52) U.S. Cl.
CPC ............. *B62D 1/105* (2013.01); *B63H 25/02* (2013.01); *B63H 2025/022* (2013.01)

(58) Field of Classification Search
CPC ... B62D 1/105; B63H 25/02; B63H 2025/022
See application file for complete search history.

(56) References Cited

U.S. PATENT DOCUMENTS

| 3,543,874 A | 12/1970 | Nevett |
| 4,604,912 A | 8/1986 | Sugita et al. |
| (Continued) | | |

FOREIGN PATENT DOCUMENTS

| EP | 0 341 887 A1 | 5/1989 |
| FR | 2 541 644 A1 | 8/1984 |
| (Continued) | | |

OTHER PUBLICATIONS

International Search Report, dated Oct. 11, 2017, from corresponding PCT/IB2017/053461 application.

*Primary Examiner* — Jake Cook
(74) *Attorney, Agent, or Firm* — Young & Thompson

(57) ABSTRACT

Disclosed is an apparatus for varying the direction of travel of a vehicle, including a rotatable unit operable by the vehicle driver, in particular by gripping, to vary the vehicle's direction of travel, and a support, or hub for rotatably supporting the rotatable unit, having a respective longitudinal axis and connected fixedly to the vehicle. The support for rotatably supporting the rotatable unit has a unit for transferring movement of the rotatable unit to a corresponding unit for controlling the vehicle's direction of travel, such the rudder of the water-borne vehicle, through a corresponding transmission. The transfer unit transfers movement of the rotatable unit, or steering wheel to the unit for controlling the vehicle's direction of travel, in particular through the transmission to the self-same controlling unit, preferably through the rotary transmission shaft, with a transmission ratio of 1:1.

20 Claims, 5 Drawing Sheets

(51) Int. Cl.
    *B62D 1/10*     (2006.01)
    *B63H 25/02*     (2006.01)

(56) References Cited

U.S. PATENT DOCUMENTS

| | | | | |
|---|---|---|---|---|
| 4,759,235 | A | * | 7/1988 | Hiramitsu ............... B62D 1/105 |
| | | | | 475/339 |
| 2003/0067147 | A1 | * | 4/2003 | Holmes ............... B60R 21/2032 |
| | | | | 280/731 |
| 2005/0284246 | A1 | * | 12/2005 | Faeth ................... B62D 1/105 |
| | | | | 74/409 |
| 2006/0213315 | A1 | * | 9/2006 | Faeth ................... B60R 16/027 |
| | | | | 74/552 |
| 2007/0063503 | A1 | * | 3/2007 | Pradel ................... B62D 1/105 |
| | | | | 280/779 |
| 2007/0186717 | A1 | * | 8/2007 | Chapelain ............. B62D 1/105 |
| | | | | 74/552 |
| 2007/0209470 | A1 | * | 9/2007 | Lube ................... B62D 1/105 |
| | | | | 74/552 |
| 2008/0315564 | A1 | | 12/2008 | Muller |
| 2017/0233050 | A1 | | 8/2017 | Tosini |

FOREIGN PATENT DOCUMENTS

| | | | |
|---|---|---|---|
| JP | H01 148640 | A | 6/1989 |
| WO | 2005/100097 | A1 | 10/2005 |
| WO | 2016/055871 | A1 | 4/2016 |

\* cited by examiner

APPARATUS FOR VARYING THE DIRECTION OF TRAVEL OF A VEHICLE, IN PARTICULAR A WATER-BORNE VEHICLE

TECHNICAL FIELD

This invention relates to an apparatus for varying the direction of travel of a vehicle, in particular a water-borne vehicle.

BACKGROUND ART

Known in the prior art are apparatuses for varying the direction of travel of a water-borne vehicle, especially a watercraft, preferably a yacht. These apparatuses comprise rotatable means, or steering wheel which can be operated by the vehicle driver, in particular by gripping, to vary the vehicle's direction of travel, and supporting means, or hub for rotatably supporting the rotatable means, or steering wheel and which have a respective longitudinal axis and are connected fixedly to the vehicle, in particular to the dashboard of the water-borne vehicle.

In these prior art apparatuses for varying the direction of travel of a water-borne vehicle, the supporting means, or hub for rotatably supporting the rotatable means, or steering wheel have transfer means for transferring the movement of the rotatable means, or steering wheel to corresponding means for controlling the vehicle's direction of travel, defined for example by the rudder of the water-borne vehicle, in particular through the agency of corresponding transmission means, preferably comprising a respective rotary shaft.

However, in the prior art apparatuses for varying the direction of travel of a water-borne vehicle, the steering wheel or helm must be turned several times to obtain only very minor angular movements of the rudder in order to vary the direction of travel of the water-borne vehicle. As a result, it is awkward or difficult for the driver of the water-borne vehicle to operate the means for changing the vehicle's direction of travel.

Also known in the prior art are apparatuses for changing the direction of travel of a water-borne vehicle which comprise a fixed, central part and which are provided with a gear system in which the input and output shafts are offset from each other. In these prior art apparatuses, the transmission ratio between the steering wheel and the rotary shaft for transmission to the rudder is thus modified compared to that of the constructor's original design, with the disadvantage that, in a water-borne vehicle equipped with this gear system, which, moreover, is complex and difficult to make and install, operation of the means for changing the direction of travel is relatively ineffective.

Also known in the prior art are apparatuses for changing the direction of travel of a water-borne vehicle which use one or more planetary gear systems. These planetary gear systems, however, occupy an excessive amount of space and are complex and difficult to make and install.

In this field, therefore, there continues to be a need for an apparatus for changing the direction of travel of a vehicle, in particular a water-borne vehicle, which is particularly simple in configuration, easy to assemble and/or particularly effective to use.

DISCLOSURE OF THE INVENTION

This invention therefore proposes a new solution as an alternative to the solutions known up to now and, more specifically, proposes to overcome one or more of the above mentioned drawbacks or problems and/or to meet one or more of the needs felt by the trade and which, in particular, may be inferred from the above.

Accordingly provided is an apparatus for varying the direction of travel of a vehicle, in particular a water-borne vehicle, especially a watercraft, preferably a yacht, comprising rotatable means, or steering wheel which can be operated by the vehicle driver to vary the vehicle's direction of travel, and supporting means, or hub for rotatably supporting the rotatable means, or steering wheel, and which have a respective longitudinal axis and are connected fixedly to the vehicle, in particular to the water-borne vehicle, preferably to the dashboard of the water-borne vehicle, the supporting means, or hub for rotatably supporting the rotatable means, or steering wheel having transfer means for transferring the movement of the rotatable means, or steering wheel to corresponding means for controlling the vehicle's direction of travel, defined for example by the rudder of the water-borne vehicle, in particular through the agency of corresponding transmission means, preferably comprising a respective rotary shaft characterized in that the transfer means are adapted to transfer the movement of the rotatable means, or steering wheel to the means for controlling the vehicle's direction of travel, in particular through the transmission means to the self-same controlling means, preferably through the rotary transmission shaft, with a transmission ratio of 1:1.

Thus, the driver of the vehicle, specifically, of the water-borne vehicle, can perform particularly prompt and effective manoeuvres to change the vehicle's travel direction.

BRIEF DESCRIPTION OF THE DRAWINGS

This and other innovative aspects, or specific advantageous embodiments, are set out in the appended claims and the technical features are apparent from the detailed description which follows of a preferred, advantageous embodiment which must, however, be considered purely as a non-limiting example of the invention, the description being made with reference to the accompanying drawings, in which:

DETAILED DESCRIPTION OF PREFERRED EMBODIMENTS OF THE INVENTION

Figure 1:
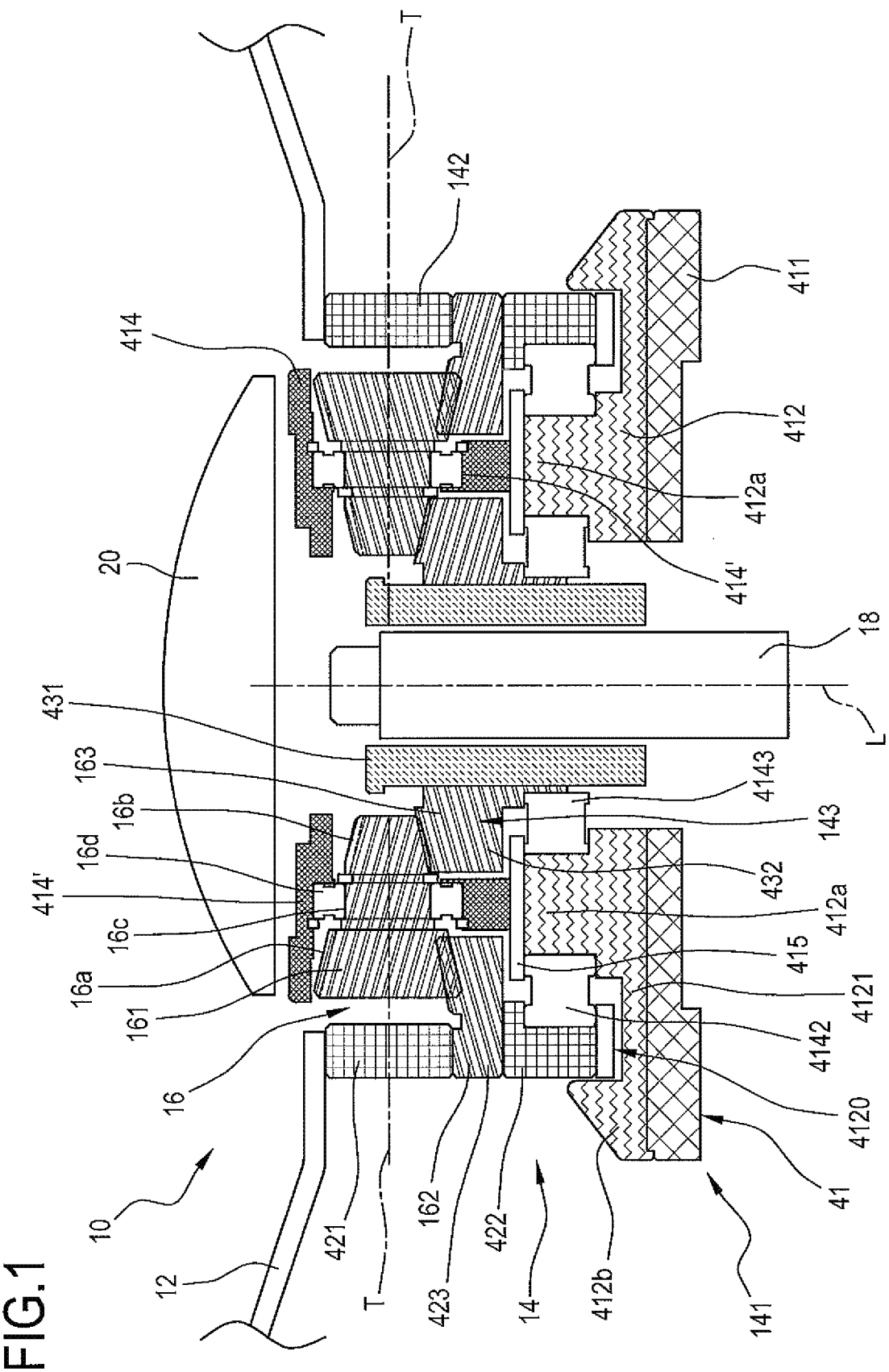
FIG. 1 is a cross section, through line I-I of FIG. 4, of a preferred embodiment of the apparatus according to the invention.
Figure 2:
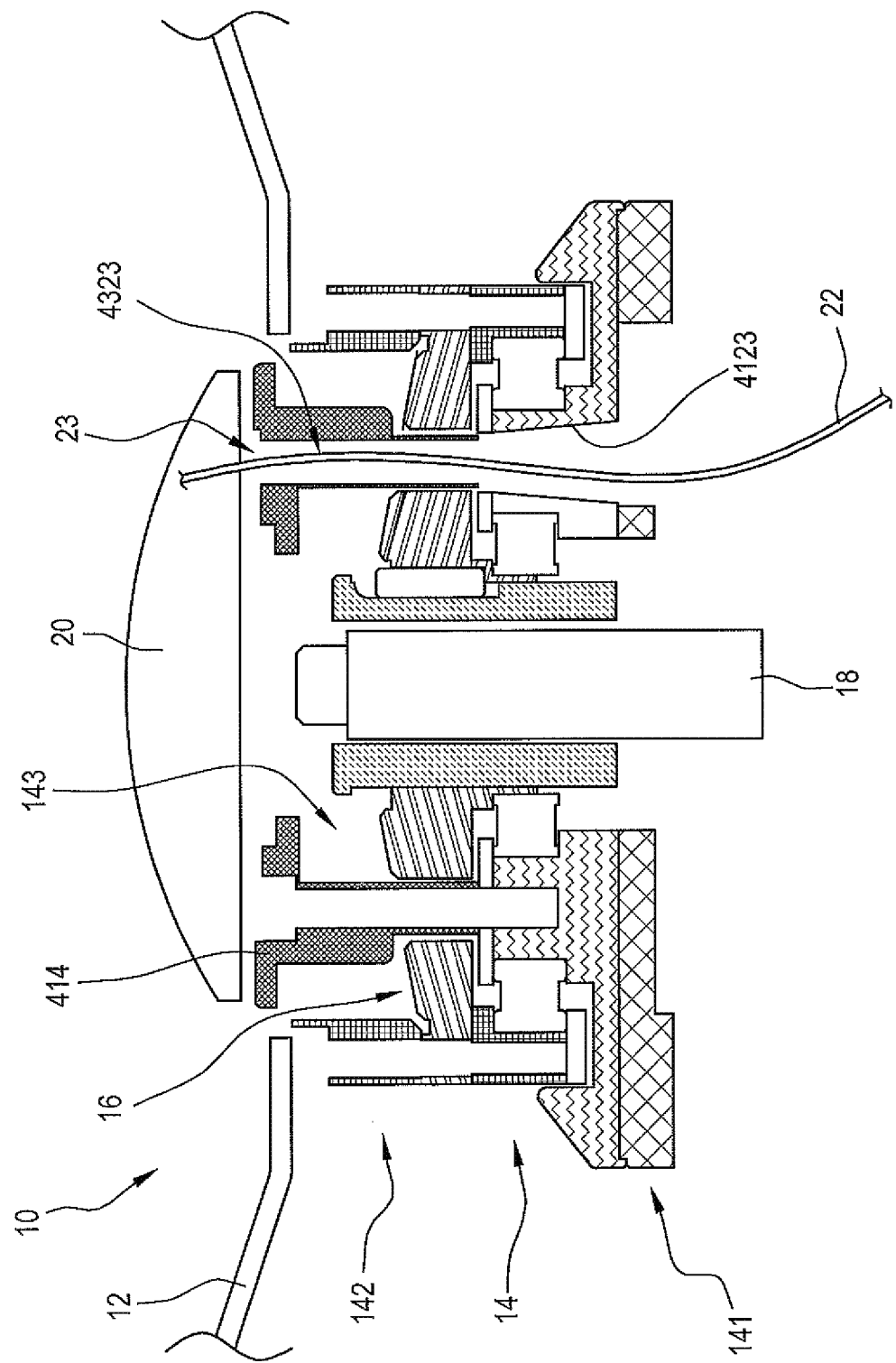
FIG. 2 is a cross section, through line II-II of FIG. 4, of the preferred embodiment of the apparatus according to the invention.
Figure 3:
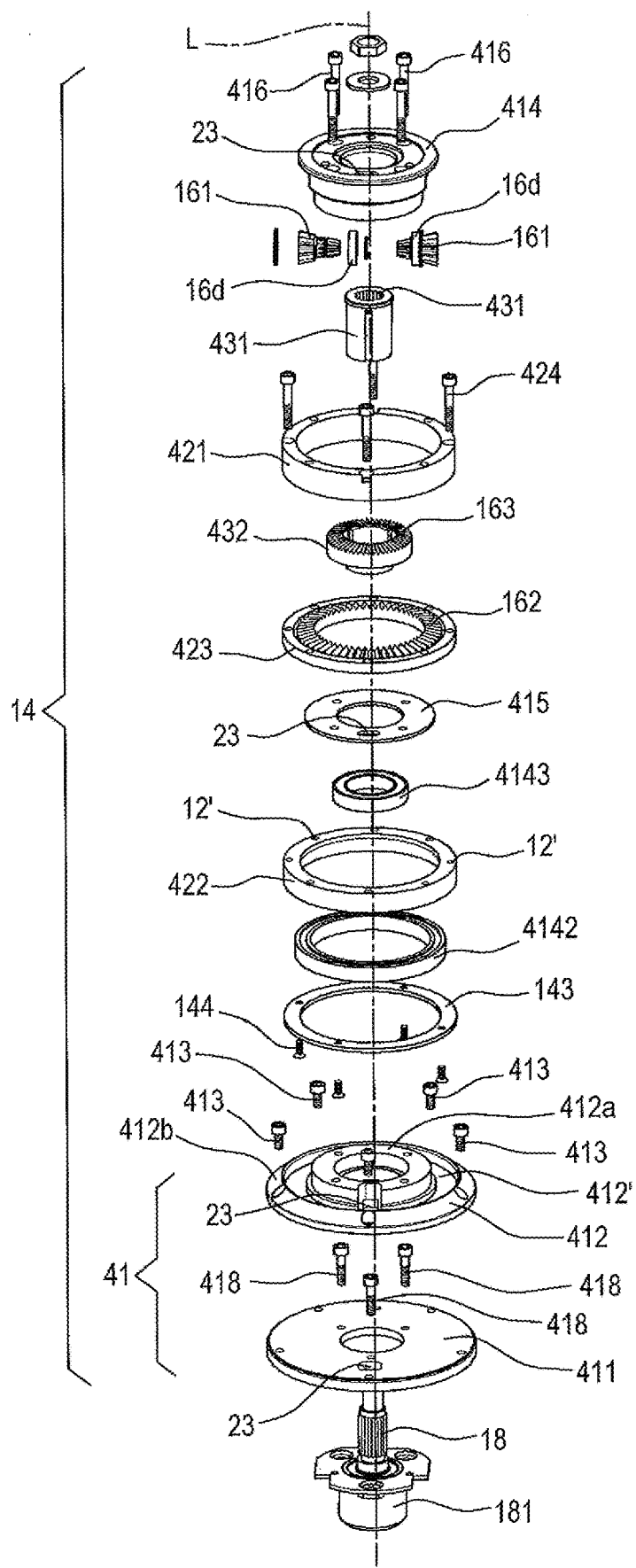
FIG. 3 is an exploded perspective view of the preferred embodiment of the apparatus according to the invention.
Figure 4:
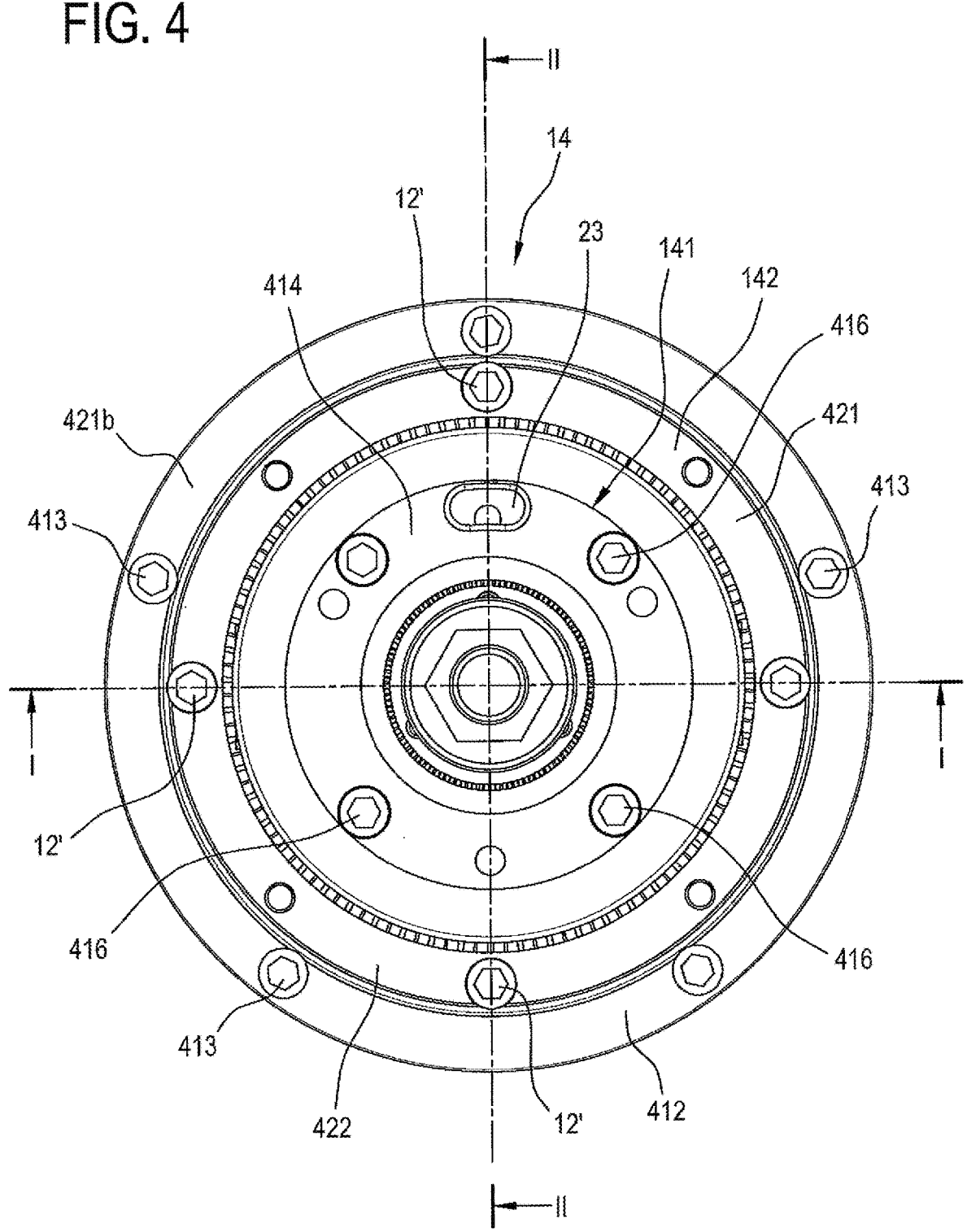
FIG. 4 is a top plan view of the preferred embodiment of the apparatus according to the invention.
Figure 5:
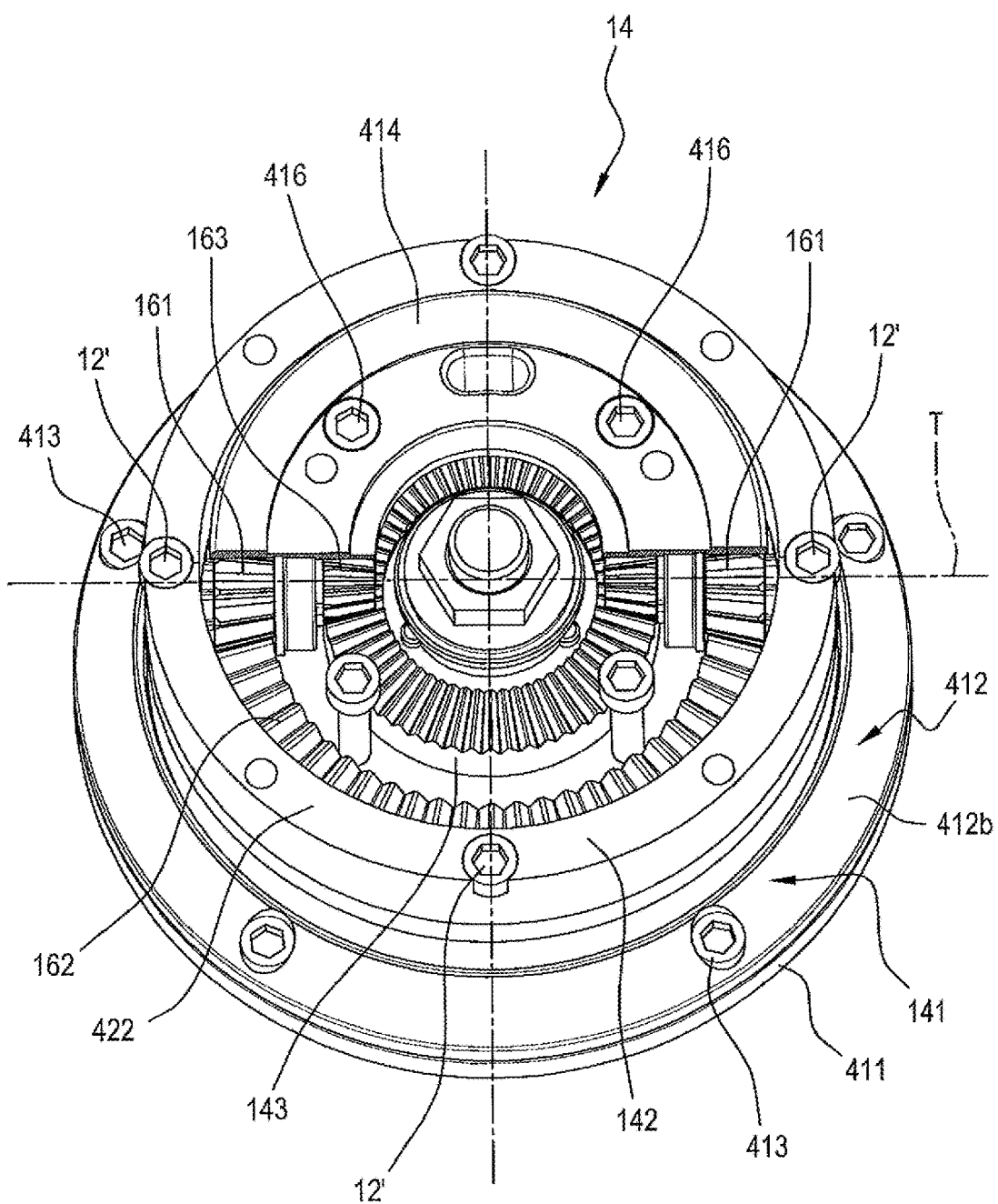
FIG. 5 is a perspective, partly cutaway view of the preferred embodiment of the apparatus according to the invention.

The accompanying drawings show a preferred embodiment 10 of an apparatus for varying the direction of travel of a vehicle, in particular a water-borne vehicle, especially a watercraft, preferably a yacht.

In the accompanying drawings, the vehicle, in particular the water-borne vehicle, like the respective rudder for varying the direction of travel thereof, is not illustrated in detail.

As illustrated, the apparatus comprises rotatable means, or steering wheel 12 which can be operated by the vehicle driver, in particular by gripping, to vary the vehicle's direction of travel, and supporting means, or hub 14 for rotatably supporting the rotatable means, or steering wheel 12, the supporting means, or hub 14 having a respective longitudinal axis "L" and being connected fixedly to the vehicle, or water-borne vehicle, preferably to a fixed part or a part fixed to the vehicle frame, that is to the dashboard of the water-borne vehicle, and having transfer means 16 for transferring the movement of the rotatable means, or steering wheel 12 to corresponding means for controlling the vehicle's direction of travel, defined for example by the rudder of the water-borne vehicle, in particular through the agency of corresponding transmission means, preferably comprising a respective rotary shaft 18.

Advantageously, the transfer means 16 are adapted to transfer the movement of the rotatable means, or steering wheel 12 to the means for controlling the vehicle's direction of travel, in particular through the transmission means 18 to the self-same controlling means, preferably through the rotary transmission shaft 18, with a transmission ratio of 1:1.

Thus, the driver of the vehicle, specifically, of the water-borne vehicle, can perform particularly prompt and effective manoeuvres to change the vehicle's travel direction.

Advantageously, the rotatable supporting means, or hub 14 comprise fixed means 141 which are integral with the vehicle, in particular with the water-borne vehicle, specifically to the dashboard thereof, and which support in freely rotatable manner corresponding first movable means 142, which are integral with the rotatable means, or steering wheel 12, and second movable means 143, which are in particular integral with the transmission means 18 for transmitting the control movement, that is, to the rotary transmission shaft 18, the second movable means 143 being rotatably supported by the fixed means 141 separately or independently of the first movable means 142; the first movable means 142 being operatively connected to the second movable means 143 to transfer thereto the movement imparted by the driver to the rotatable means, or steering wheel 12, in particular, as mentioned above, with a transmission ratio of 1:1.

In other words, the rotatable supporting hub 14 comprises a fixed element 141, for fixing to the vehicle, and a first and a second movable element 142 and 143, which are integral, respectively, to the steering wheel 12 and to the shaft 18 for transmitting the rotation of the wheel 12 to the means for varying the vehicle's travel direction.

The apparatus thus obtained is particularly simple in configuration and, what is more, easy to make or assemble.

Advantageously, the fixed means 141, which are integral with the vehicle, the first movable means 142, which are integral with the rotatable means, or steering wheel 12, and the second movable means 143, which are in particular integral with the transmission means, or rotary shaft 18 for transmitting the control movement, are coaxial with each other.

The apparatus thus obtained has a particularly simple and effective configuration.

The apparatus thus obtained is also particularly compact in construction and advantageously limited in size.

Advantageously, as may be inferred from the corresponding drawings, the first movable means 142, which are integral with the rotatable means, or steering wheel 12, are coaxial with and radially outside at least part of the fixed means 141 which are integral with the vehicle, specifically with the water-borne vehicle.

Advantageously, as may be inferred from the corresponding drawings, the second movable means 143, which are integral with the transmission means, or shaft 18 for transmitting the movement, are coaxial with and radially inside the fixed supporting means 141 which are integral with the vehicle, specifically with the water-borne vehicle.

Advantageously, the transfer means 16 for transferring the movement of the rotatable means, or steering wheel 12 to the transmission means or shaft 18 comprise respective transmission means 161 which are, in particular, in the form of respective rotary means which are rotatable preferably about an axis "T" transverse to the longitudinal axis "L" of the apparatus.

It is thus possible to obtain an apparatus which is particularly simple in configuration, effective and easy for the driver of the water-borne vehicle to manoeuvre.

Advantageously, the transfer means, which are rotatable about an axis T transverse to the longitudinal axis L of the apparatus are in the form of respective gear means 161.

Advantageously, the transfer means 161, which are rotatable about an axis T transverse to the longitudinal axis L of the apparatus, are rotatably supported relative to the transverse axis T by the fixed means 141 of the supporting means or hub which are integral with the vehicle, specifically with the water-borne vehicle 14.

Advantageously, means 162 are provided for actuating the transfer means 161 and which are rotatable about an axis transverse to the longitudinal axis of the apparatus.

Advantageously, the means 162 for actuating the transfer means 161, which are rotatable about an axis transverse to the longitudinal axis of the apparatus, are integral with the rotatable means or steering wheel 12.

Advantageously, the means 162 for actuating the transfer means 161, which are rotatable about an axis transverse to the longitudinal axis of the apparatus, are integral with and supported by the first movable means 142 which are integral with and support the rotatable means or steering wheel 12.

The means 162 for actuating the transfer means 161, which are rotatable about an axis T transverse to the longitudinal axis L of the apparatus advantageously comprise or are in the form of a crown gear 162, in particular a crown gear having radially projecting teeth extending from the respective base towards the respective apex along the direction of the longitudinal axis L of the supporting means, or hub 14, and/or which is preferably in the form of a bevel crown gear 162.

Advantageously, means 163 are provided for actuating the transmission means or shaft 18 for transmitting motion to the means for controlling the direction of the vehicle, in particular of the water-borne vehicle.

Advantageously, the means 163 for actuating the transmission means 18 for transmitting motion to the means for controlling the direction of the vehicle, in particular of the water-borne vehicle, are in the form of respective movable means with the same transmission means or shaft 18. The means 163 for actuating the transmission means 18 are advantageously integral with, or supported by, the second movable means 143 which are integral with the transmission means 18 for transmitting the control movement.

Advantageously, the means 163 for actuating the transmission means 18, comprise or are in the form of a respective crown gear 163, in particular a crown gear having radially projecting teeth extending from the respective base towards the respective apex along the direction of the longitudinal axis L of the supporting means, or hub 14, and/or which is preferably in the form of a bevel crown gear 163.

Advantageously, the crown gear 163 for actuating the transmission means 18 is coaxial with, in particular coaxially internal, and preferably substantially on the radial extension of, the crown gear 162 for actuating the transfer means 161.

Advantageously, the transfer means comprise a toothed pinion 161 having a set of teeth 16a for meshing with the crown gear 162 which actuates the self-same transfer means 161 and a second set of teeth 16b for meshing with the crown gear 163 which actuates the transmission means 18.

Advantageously, the first and/or the second set of teeth 16a, 16b of the transfer pinion 161 are respectively in the form of a set of bevel teeth, that is, provided on a corresponding bevel profile of the pinion 161 itself.

More specifically, as illustrated, the first and second sets of bevel teeth 16a, 16b of the transfer pinion 161 are radially convergent towards the outside of the apparatus.

Advantageously, the first and second sets of teeth 16a, 16b of the transfer pinion 161 are separated by a cylindrical zone 16c of the outside surface of the pinion 161 itself, defining an engagement surface for rotatable supporting means, in particular in the form of a respective bearing 16d with transverse axis, the rotatable supporting means 16d being supported by the means 141, fixed to the vehicle, of the rotatable supporting hub 14.

More specifically, one or more transfer pinions 161 are provided, in particular a plurality of transfer pinions 161, in particular lying in the same plane transverse to the axis L of the hub 14.

More specifically, a first and a second pinion 161, 161 are provided which are preferably angularly spaced from each other by 180°, and if necessary, according to a further embodiment, not illustrated in detail in the accompanying drawings, the addition of a third pinion 161 is also imaginable and preferably, in this embodiment, the first, second and third pinions would be angularly spaced from each other by 120°.

That way, a convenient rotational drive is obtained for the transmission means or shaft 18 for transmitting motion to the means for controlling the direction of the vehicle, in particular of the water-borne vehicle.

Advantageously, the supporting means or hub 14 for rotatably supporting the rotatable means or steering wheel 12 firmly or fixedly, that is, non-rotatably, support corresponding means 20 which are usable by the driver and which in particular comprise one or more elements for controlling respective devices of the vehicle and/or corresponding display means, for example in the form of an electronic display.

Advantageously, means 22 are provided for the transmission of power, of a control and/or for data transmission, from and with the fixed usable means 20.

More specifically, as illustrated, the means for the transmission of power signals, of a control and/or for data transmission, from and with the fixed usable means 20, comprise at least one respective electrical and/or data cable 22.

Advantageously, the supporting means or hub 14 for rotatably supporting the rotatable means or steering wheel 12 comprise ducting means 23 for the means or cable 22 for the transmission of power, of a control and/or for data transmission, from and with the fixed means 20 usable by the driver.

More specifically, the ducting means for the means or cable 22 for the transmission of power signals, of a control and/or for data transmission, from and with the fixed usable means 20 comprise at least one longitudinal through hole 23 made in the fixed means 141 of the supporting means or hub 14.

Advantageously, the fixed means 141 of the supporting means or hub 14 have a respective supporting base 41 for fastening to the vehicle, in particular to the water-borne vehicle, in particular to the dashboard of the vehicle, in particular of the water-borne vehicle, and preferably to a corresponding block 181 which supports the transmission shaft 18 in freely rotatable manner.

More specifically, as illustrated, corresponding screws 418 are provided for fastening the base 41 to the vehicle, in particular to the water-borne vehicle, preferably to the self-same supporting block 181.

Advantageously, the base 41 of the supporting means or hub 14 comprises a first flange 411 and a second flange 412 which are joined to each other, especially by means of corresponding fastening screws 413.

Advantageously, as may be inferred from the corresponding drawings, the base 41 of the supporting means or hub 14 comprises an axial protrusion, preferably cylindrical 412a in particular for rotatably supporting the first and second movable means 142, 143.

More specifically, as illustrated, the first flange 411 is at the longitudinal end of the supporting hub 14 and is preferably planar in shape, or generally planar in shape.

Advantageously, the second flange 412 comprises a main portion 412', in particular generally planar in shape from which there extends axially the preferably cylindrical, central protrusion 412a, in particular for rotatably supporting the first and second movable means 142, 143, and from which, preferably, there extends an outer protrusion 412b, whose external profile is preferably conical, the outer profile 412b and the inner profile 412a defining between them an annular space 4120 for insertion of a corresponding longitudinal end of the first movable means 142 of the supporting hub 14.

Advantageously, the base (41), and/or the first and/or the second flange 411, 412 thereof define a wide central opening, in particular circular, for the passage of the transmission means or shaft 18 towards the means for controlling the vehicle's direction, and/or for housing a corresponding longitudinal end of the second movable means 143 of the supporting hub 14.

More specifically, as illustrated, the base 41, and/or the first and/or the second flange 411, 412 thereof extend radially beyond the first movable means 142 of the supporting hub 14.

More specifically, as illustrated, the axially protruding central portion 412a of the base 41 of the supporting means or hub 14 defines, at the respective outer and/or inner peripheral face, or preferably at both the inner and outer peripheral faces, a respective annular seat for respective bearing means 4142 and/or 4143 for the first and second movable means 142, 143 respectively.

Advantageously, therefore, bearing means 4142 are provided, in particular with longitudinal axis, preferably in the form of a single bearing 4142 for rotatably supporting the first movable means 142 for supporting and fastening to the rotatable means, or steering wheel 12.

More specifically, as illustrated, bearing means 4143 are provided, in particular with longitudinal axis, preferably in the form of a single bearing 4143 for rotatably supporting the second movable means 143 for fastening to the transmission means 18 which transmit the control movement.

Advantageously, the bearing means 4143 for rotatably supporting the second movable means 143 for fastening to the transmission means 18 which transmit the control movement are coaxially mounted inside the bearing means 4142 for rotatably supporting the first movable means 142 for supporting and fastening to the rotatable means, or steering wheel 12.

Advantageously, the fixed supporting means 141 have a supporting block 414 for supporting the means 20 usable by the driver, the block 414 being connected, in particular by corresponding screws 416, preferably with an interposed thin annular flange 415, to the supporting base 41, or rather, to the second flange 412 thereof.

Advantageously, the first movable means 142 comprise a respective annular block, in particular a first and a second annular block 421, 422, and a flange 423 which mounts the actuating crown gear 162, the crown gear mounting flange 423 being in particular interposed between the first and second annular blocks 421, 422, where the first annular block 421 supports the respective steering wheel or means 12, which are preferably fixed at the transverse end surface of the first annular block 421 itself, in particular fixed by respective screws to corresponding seats 12' provided at the upper end of the movable means 142, in particular of the first annular block 421 thereof.

More specifically, as illustrated, the first movable means 142 comprise a thin lower flange 143 which is attached to the annular block, in particular to the lower annular block 422 thereof, especially by corresponding screws 144, the lower flange 143 defining shoulder means for the corresponding bearing 4142 for rotatably supporting the selfsame first movable means 142.

Advantageously, the block 414 defines corresponding hole means 414', in particular a first, a second and, possibly, a third hole, with transverse axis, for housing corresponding bearing means 16d for rotatably supporting a respective transmission pinion 161 for the means which transfer the motion of the rotatable means or steering wheel to the means for controlling the vehicle's direction.

Advantageously, the second movable means 143 comprise a sleeve 431 for engagement with the transmission means 18, in particular having a corresponding inner set of teeth 431' for engaging the toothed profile 18' of the transmission shaft 18 which externally mounts a flange 432 which mounts the crown gear 162 for actuating the transmission means or shaft 18 and, in particular, which defines a corresponding annular shoulder and related seat for engaging the corresponding bearing means 4143 which rotatably support the second movable means 143.

Advantageously, the fixed means 141 comprise a fixed block 414 for supporting the means 20 usable by the driver and which has respective longitudinal through hole means 4323, in particular in the form of a single hole 4323, preferably transversely oblong, for the axial passage of the means or cable 22 for the transmission of power, of a control and/or for data transmission, from and with the fixed usable means 20.

Advantageously, the supporting base 41 and/or the first and/or the second flange 411, 412 thereof comprises respective longitudinal through hole means 4123, in particular in the form of a single hole, preferably transversely oblong, for the axial passage of the means or cable 22 for the transmission of power, of a control and/or for data transmission, from and with the fixed usable means 20.

In practice, as is evident, the technical features described above, individually or in combination, allow this apparatus to achieve at least one or more of the following advantageous results:

obtaining an apparatus whose configuration is particularly simple and whose operation is particularly effective;

obtaining an apparatus which is easy to make or assemble;

obtaining an apparatus which is effective in use and manoeuvrability;

obtaining an apparatus which occupies little space; and/or obtaining an apparatus which is easy to install;

The invention described is susceptible of industrial application. It would be obvious to one skilled in the art that several changes and modifications can be made to the invention without departing from the spirit and scope of the invention, described in depth above. Also, further preferred embodiments of the invention comprising one or more of the features described herein can easily be imagined. It will also be understood that all the details of the invention may be replaced by technically equivalent elements.

The invention claimed is:

1. An apparatus for varying the direction of travel of a watercraft vehicle, comprising a steering wheel which can be operated by the vehicle driver to vary the vehicle's direction of travel, and a hub (14) for rotatably supporting the steering wheel, the hub having a respective longitudinal axis and being connected fixedly to the vehicle, the hub having transfer means for transferring the movement of the steering wheel to corresponding means for controlling the vehicle's direction of travel, through the agency of corresponding transmission means comprising a respective rotary shaft, the transfer means being adapted to transfer the movement of the steering wheel to the means for controlling the vehicle's direction of travel, through the transmission means to the self-same controlling means, with a transmission ratio of 1:1;

wherein:

the hub comprise fixed means which are integral with the vehicle and which support in freely rotatable manner corresponding first movable means, which are integral with the steering wheel, and second movable means, which are integral with the transmission means, the second movable means being rotatably supported by the fixed means separately or independently of the first movable means, the first movable means being operatively connected to the second movable means to transfer thereto the movement imparted by the driver to the steering wheel;

the transfer means are rotatably supported relative to the transverse axis by the fixed means;

the apparatus comprises means for actuating the transfer means, said means for actuating the transfer means being integral and supported by the first movable means;

the means for actuating the transfer means comprise a crown gear, having radially projecting teeth extending from the respective base towards the respective apex along the direction of the longitudinal axis;

the apparatus comprises means for actuating the transmission means for transmitting the motion to the means for controlling;

the means for actuating the transmission means being integral with the second movable means;

the means for actuating the transmission means comprise a respective crown gear, having radially projecting teeth extending from the respective base towards the respective apex along the direction of the longitudinal axis;

the crown gear for actuating the transmission means is coaxially internal with respect to the crown gear for actuating the transfer means;

the transfer means comprise a toothed pinion having a set of teeth for meshing with the crown gear for actuating the same transfer means and a second set of teeth for meshing with the crown gear for actuating the transmission means.

2. The apparatus according to claim 1, wherein the fixed means, the first movable means, and the second movable means, are coaxial with each other.

3. The apparatus according to claim 2, wherein the first movable means, are coaxial with and radially outside at least part of the fixed means.

4. The apparatus according to claim 3, wherein the second movable means are coaxial with and radially inside the fixed means.

5. The apparatus according to claim 1, wherein the first and/or the second set of teeth of the transfer pinion are respectively bevel.

6. The apparatus according to claim 1, wherein the first and the second set of teeth of the transfer pinion are separated by a cylindrical zone of the outside surface of the pinion itself, defining an engagement surface for rotatable supporting means in the form of a respective bearing with transverse axis, the rotatable supporting means being supported by the means, fixed to the vehicle, of the rotatable supporting hub.

7. The apparatus according to claim 1, further comprising one or more transfer pinions, in particular a plurality of transfer pinions, in particular lying in the same plane transverse to the axis of the hub.

8. The apparatus according to claim 1, further comprising a first and a second opinion.

9. The apparatus according to claim 1, wherein the hub firmly or fixedly supports corresponding means which are usable by the driver and which in particular comprise one or more elements for controlling respective devices of the vehicle and/or corresponding display means.

10. The apparatus according to claim 9, wherein:
the apparatus comprises means for the transmission of power signals, of a control and/or for data transmission, from and with the fixed usable means;
the means for the transmission of power signals, of a control and/or for data transmission, from and with the fixed usable means, comprise at least one respective electrical and/or data cable;
the supporting means or hub for rotatably supporting the rotatable means or steering wheel comprise ducting means for the means or cable for the transmission of power, of a control and/or for data transmission, from and with the fixed usable means;
the ducting means for the means or cable for the transmission of power, of a control and/or for data transmission, from and with the fixed usable means comprise at least one longitudinal through hole made in the fixed means of the supporting means or hub.

11. The apparatus according to claim 1, wherein:
the fixed means have a respective supporting base for fastening to the vehicle;
the base comprises a first flange and a second flange which are joined to each other;
the base comprises an axial protrusion, for rotatably supporting the first and second movable means.

12. The apparatus according to claim 11, wherein:
the first flange is planar or generally planar in shape;
the second flange comprises a main portion, generally planar in shape from which there extends axially a central cylindrical protrusion for rotatably supporting the first and second movable means, and from which, there extends an outer protrusion, whose external profile is conical, the outer profile and the inner profile defining between them an annular space for insertion of a corresponding longitudinal end of the first movable means;
the base, and/or the first and/or the second flange thereof define a wide central opening, for the passage of the transmission means or shaft towards the means for controlling the vehicle's direction, and/or for housing a corresponding longitudinal end of the second movable means;
the base (41), and/or the first and/or the second flange thereof extend radially beyond the first movable means;
the axially protruding central protrusion defines, at the respective outer and/or inner perimeter face, a respective annular seat for respective bearing means for the first and second movable means respectively;
the apparatus comprises bearing means for rotatably supporting the first movable means for supporting and fastening to the steering wheel;
the apparatus comprises bearing means, in particular with longitudinal axis, for rotatably supporting the second movable means for fastening to the transmission means which transmit the control movement;
the bearing means for rotatably supporting the second movable means are coaxially mounted inside the bearing means for rotatably supporting the first movable means.

13. The apparatus according to claim 1, wherein:
the hub firmly or fixedly supports corresponding means which are usable by the driver and which in particular comprise one or more elements for controlling respective devices of the vehicle and/or corresponding display means;
the fixed means have a respective supporting base for fastening to the vehicle;
the base comprises a first flange and a second flange which are joined to each other;
the base comprises an axial protrusion, for rotatably supporting the first and second movable means;
the fixed supporting means have a supporting block for supporting the means usable by the driver, the block being connected by corresponding screws, with an interposed thin annular flange, to the supporting base, or to the second flange thereof;
the block defines corresponding hole means, in particular a first, a second and, possibly, a third hole, with transverse axis, for housing corresponding bearing means for rotatably supporting the pinion.

14. The apparatus according to claim 1, wherein:
the first movable means comprise a first and a second annular block, and a flange which mounts the actuating crown gear, the crown gear mounting flange being interposed between the first and second annular blocks, where the first annular block supports the respective steering wheel, which is fixed at the transverse end surface of the first annular block itself;
the second movable means comprise a sleeve for engagement with the transmission means, in particular having a corresponding inner set of teeth for engaging the toothed profile of the transmission shaft which externally mounts a flange which mounts the crown gear for actuating the transmission means or shaft and, which defines a corresponding annular shoulder and related seat for engaging the corresponding bearing means which rotatably support the second movable means.

15. The apparatus of claim 8, wherein the first and a second opinion are angularly spaced from each other by 180°.

16. The apparatus of claim 1, further comprising first, second, and third pinions.

17. The apparatus of claim 16, wherein the first, second and third pinions are angularly spaced from each other by 120°.

18. The apparatus of claim 11, wherein the first and second flanges are joined to each other by corresponding fastening screws.

19. The apparatus of claim 13, wherein the first and second flanges are joined to each other by corresponding fastening screws.

20. The apparatus of claim 11, wherein the bearing means is arranged along a longitudinal axis.

* * * * *